United States Patent [19]

Lomasney et al.

[11] Patent Number: 4,632,847
[45] Date of Patent: Dec. 30, 1986

[54] IN SITU POLYMERIC MEMBRANE FOR ISOLATING HAZARDOUS MATERIALS

[75] Inventors: Henry L. Lomasney; John G. Grawe, both of New Orleans; Vikram K. Sheth, Kenner, all of La.

[73] Assignee: Isotek Corporation, New Orleans, La.

[21] Appl. No.: 698,692

[22] Filed: Feb. 6, 1985

[51] Int. Cl.[4] .......................... B08B 7/00; B65B 33/00
[52] U.S. Cl. ........................................ 427/154; 134/4; 427/156
[58] Field of Search ...................... 134/4; 427/154, 156

[56] References Cited

U.S. PATENT DOCUMENTS

| | | | |
|---|---|---|---|
| 2,365,705 | 12/1944 | Jeri ....................................... | 427/154 |
| 3,583,932 | 6/1971 | Benton et al. ................... | 427/154 X |
| 3,620,796 | 11/1971 | Gordy .............................. | 427/154 X |
| 4,199,375 | 4/1980 | Muller ..................................... | 134/4 |
| 4,199,620 | 4/1980 | Edwards et al. .................... | 134/4 X |
| 4,325,744 | 4/1982 | Panayappan et al. ................... | 134/4 |

FOREIGN PATENT DOCUMENTS

| | | | |
|---|---|---|---|
| 617410 | 7/1978 | U.S.S.R. .................................... | 134/4 |
| 927350 | 5/1982 | U.S.S.R. .................................... | 134/4 |

OTHER PUBLICATIONS

Chemical Abstracts vol. 101, No. 197312m, De Waele–Laser Microprobe Analysis of O-phenylenediamine on Asbestos Fibers.
Chemical Abstracts, vol. 94, No. 213379h, Mauvier, G. et al., Interaction between Solid Particles and Gaseous Pollutants.
Chemical Abstracts, vol. 98, No. 112781k, De Waele, J. et al., Laser Microprobe Mass Analysis of Asbestos Fiber Surfaces for . . . .
Chemical Abstracts, vol. 89, No. 377762p, Thomson, Ruth, Effect of Asbestos–Associated Metal Ions on the Binding of Benzo[a]pyrene . . . .
Chemical Abstracts, vol. 99, No. 100485z, Bonneau, L. et al., Study of Electron–Donor Sites and Electron–Acceptor Sites on . . . .
Chemical Abstracts, vol. 98, No. 39876p, Fournier, Jeanine, Study of the Adsorption Mechanism of Polynuclear Aromatic Hydrocarbons . . . .
Chemical Abstracts, vol. 91, No. 40297n, Koldunovich, G. E. et al., Nature of the Adsorption Interaction of Rubbers with an Asbestos . . . .
Chemical Abstracts, vol. 94, No. 169151b, Scansetti, G., Problems Deriving from Asbestos Fibers Wetting in the Textile Industry.

*Primary Examiner*—James R. Hoffman
*Attorney, Agent, or Firm*—Roylance, Abrams, Berdo & Goodman

[57] ABSTRACT

A method and composition for providing, in situ, a polymeric membrane for isolating hazardous materials within an area such as, for example, an asbestos removal job site. The polymer is applied in liquid form to surfaces which are to be protected. Upon cure, a seamless bladder-like membrane is formed which isolates the work area and prevents the spread of airborne, or water-carried particulate. The membrane can then be peeled from the surface and compacted for disposal.

46 Claims, No Drawings

IN SITU POLYMERIC MEMBRANE FOR ISOLATING HAZARDOUS MATERIALS

FIELD OF THE INVENTION

This invention relates to protective coatings. More particularly, this invention relates to protective coatings which adhere to and isolate a particular work area to prevent the escape of hazardous airborne substances.

BACKGROUND OF THE INVENTION

There exists a significant need for the safe handling and disposal of hazardous materials. Of concern are those areas where attempts to remove such materials could involve a further exposure of personnel due to the unwarranted spread of these potentially harmful materials. The currently accepted isolation process involves erecting protective curtain enclosures which help to confine the material within existing limits. An example is the removal of asbestos materials from habitable spaces. To date, polyethylene films have become the accepted and preferred material for construction of these isolation cells. However, a number of serious limitations exist when using polyethylene to provide the required environmental barriers.

First, polyethylene sheet materials are nonadherent and are held in place with tape. Tape failure is a common occurrence that results in collapse of the protective screen. Consequently, airborne hazardous material has free access to the unprotected surface, thus requiring additional decontamination processes.

Second, the polyethylene sheeting can be readily torn, especially when it is placed in service as a floor covering. Contact by rolling scaffolds, ladders with sharp appurtenances, hose connections, and such can easily pierce the barrier. Once penetrated, water which is used to hold down the airborne dusts, and which is bearing the hazardous material, will leak into areas behind the polyethylene.

Polyethylene sheeting is slippery, especially when wet. This presents an acute problem when polyethylene is applied in double thickness, a practice often specified to help provide more confidence in the integrity of the environmental barrier. The hazard resulting from layered sheeting is further complicated by the requirement that each crew member work in a special suit consisting of boots, rubber gloves, protective clothing, and a full-face respirator. Accidents that are directly related to the presence of the sheet polyethylene are prevalent in this industry and present a significant cost consideration. A secondary consideration is the serious loss of human productivity which this "hostile" environment presents.

The installation of polyethylene sheeting is a time consuming activity.

Polyethylene sheeting presents a smooth, slick, nontacky surface, and harmful dusts can readily become airborne if the surface becomes dry.

A polyethylene sheet membrane has minimal contact with the substrate. Asbestos fibers which in any way evade the integrity of the environmental screen, can migrate extensively in the space between screen and the substrate which is to be protected. In some cases, the screen may actually enhance transport since movement of the polyethylene screen may actually cause a "pumping effect" where high velocity air currents encourage transport of hazardous particulate.

Because the polyethylene film is hung as a pseudo "shower curtain" screen, it is not possible for any practical negative pressure to be maintained in the work area. Such a negative pressure, which is usually maintained by an exhaust fan, is essential to controlling the escape of asbestos fibers during a removal program.

Upon removal, polyethylene sheeting has no tendency to congeal or to self compact. Thus, the burial volume is large and confinement of the freed asbestos is highly inefficient since self-embedding processes are not afforded.

Thus, there is a continuing need for a protective coating which can overcome the disadvantages of polyethylene films.

SUMMARY OF THE INVENTION

Accordingly, an object of this invention is to provide a coating which adheres to the surface to be protected.

Another object is to provide a covering which prevents contamination even when torn.

Another object is to provide a coating which provides safe footing whether wet or dry.

Another object is to provide a coating which can be quickly installed.

Another object is to provide a coating to which airborne particles adhere.

Another object is to provide a coating which can be easily repaired if torn.

Another object is to provide a coating which will allow a negative pressure to be maintained in the work area.

Yet another object is to provide a coating which facilitates efficient disposal.

The foregoing objects are basically attained by a process for isolating hazardous material within an area comprising the steps of: applying a liquid polymer to the surfaces to be protected; and allowing the polymer to cure, thereby forming a seamless, bladder-like membrane which adheres to the surface, and which can be removed intact by physically peeling from the surface to which it has been applied.

DETAILED DESCRIPTION OF THE INVENTION

This invention provides a unique approach for the confinement, immobilization and encapsulation of hazardous materials. The method involves constructing an environmental isolation cell in the form of a seamless bladder which acts as a barrier to, and receptacle for hazardous materials such as asbestos used in the construction industry. The receptacle-functioning bladder may be formed in all supported confinements such as auditoriums, lavatories, shower rooms, furnace rooms, duct and pipe egresses, stair wells, and elevator shafts where the use of polyethylene sheet may be ineffective or impossible.

The liquid polymer composition that ultimately forms the receptacle bladder may be installed in the hazardous material confinement site by spraying, rolling, brushing with a membrane-forming liquid formulation. Once applied, the formulation coalesces into a continuous, elastomeric membrane which has several unusual characteristics unique to this application.

Because of the environmental conditions, water serves as the preferred carrier in liquid formulation. However, since a water mist is applied during the asbestos removal process, the membrane must develop a very high degree of integrity to misting conditions in a relatively short time. This integrity has been achieved by affording an accelerated rate of coalescence, which results in the formation of a tightly knit, barrier quality membrane. The membrane forms a continuous, protective barrier which will remain tightly adherent to the substrate throughout the hazardous material removing activities, even when such activities involve considerable physical stresses against the membrane surface.

Should the membrane be pierced as a result of the physical wear and tear which occurs during the asbestos removal state, virtually no contamination of the substrate occurs beyond the damaged area because of retained intimacy between the substrate and intact membrane. Optional repair of the damaged area using a reapplication of membrane-forming liquid formulation completely restores the original integrity.

Beside providing a high integrity barrier, the second unusual property displayed by the membrane composition taught in this invention is its capacity for surface capture of hazardous materials such as asbestos. The requisite adsorption and immobilization properties are obtained by employing those membrane compositions which are capable of active and passive interaction with asbestos.

It has been discovered that capture can be enhanced through the interaction of several bonding processes such as physical interlocking of the polymer in the pores of the fiber, or by association with polar groups on the surface of asbestos. However, a bonding process unique to this invention involves the use of electron donor and acceptor sites on the surface of the fiber.

Asbestos occurs naturally in several forms such as anthophyllite, tremolite [$Ca_2Mg_5H_2(SiO_3)_8$] and chrysotile [$Mg_3H_2(SiO_4)_2H_2O$]. Each of the forms may contain varying amounts of titanium, vanadium, chromium, manganese, iron, copper and antimony. There are indications that doping of the crystal structure by these metals results in the formation of electron donor/acceptor sites along the fiber surface.

It has been demonstrated by those versed in the art that strong interactions occur between these sites and small molecules such as ammonia, amines, oxides of nitrogen, and carboxylic acids. It is the teaching of this invention that the sites can be coupled with functionality on a macromolecule, thereby providing a means of secure anchorage for the asbestos. The electron donor/acceptor interaction has been found to occur most strongly with those polymer compositions which possess the ethylenic carbon-carbon double bond functionality.

While Applicants do not wish to be bound by any specific theory, spectroscopy measurements suggest that the pi electrons of the ethylenic double bond serve as the electron donor while the metal functions as the electron acceptor. This "lock and key" interaction compliments the other adhesion processes in securely anchoring the asbestos fiber to the polymeric membrane.

Polymer compositions possessing this capture capacity preferably contain pi electrons in ethylenic double bonds and include styrene-butadiene rubbers, acrylonitrile-butadiene rubbers, butadiene rubbers, neoprene, polyisoprenea natural rubber and the like.

Through this unique property, it is possible to anchor hazardous materials such as particulate asbestos to the membrane surface and confine the hazard to the domain of the environmental cell.

Another advantage provided by the membrane composition of this invention is its ability to maintain a macroencapsulate which effectively seals and confines the hazardous material and upon removal, works to isolate the hazardous material via a monolithic package suitable for disposal. In practice, the bladder functions as a receptacle strategically designed to catch loosened hazardous materials like asbestos. Once the asbestos has been dislodged from its initial anchorage, i.e., fire resistant ceilings, decontamination of the environmental cell is simply accomplished by peeling the bladder from the protected surface, and manipulating (through rolling and folding) the freed container into a macro-encapsulated form. Smaller volume areas lend themselves to the employment of the "bag with its contents" type of disposal while larger areas lend themselves to a segmental approach where the "bag" is divided into sections, each of which forms a separate monolithic macroencapsulate.

Thus, through the approaches taught in this invention, a receptacle-functioning bladder can be constructed which provides the barrier, surface capture and macroencapsulating properties needed for complete and efficient decontamination.

The advantageous properties of the membrane are primarily attributable to the polymer composition employed. Polymers which provide the advantageous properties generally possess a capture index of at least about 2 mg asbestos/$in^2$ membrane.

The capture index, which has units of weight/area, measures the ability of a polymeric membrane to hold or capture contaminants Polymers Those polymers which exhibit a desirable capture index range include:

Polybutadiene, polybutadiene hydroxy-group terminated, polybutadiene carboxyl-group terminated, polybutadiene cis-1,2-configuration, polybutadiene cis-1,4-configuration, polybutadiene trans-1,4-configuration, cyclizied polybutadiene, epoxidized polybutadiene, nitrated polybutadiene, acrylonitrile-grafted polybutadiene, sytrene-grafted polybutadiene, poly(dicyclopentadiene) modified polybutadiene, silicone rubber modified polybutadiene, chlorinated polybutadiene, hydrogenated polybutadiene, maleated polybutadiene;

Butadiene-styrene rubber (SBR), butadiene-styrene block copolymers, butadiene-styrene triblock copolymers, hydrogenated SBR block and triblock copolymer, carboxyl-group terminated SBR, hydroxy-terminated SBR, nitrated SBR, styrene-grafted SBR, epoxidized SBR, chlorinated SBR, vinyl chloride-grafted SBR, acrylonitrile-grafted SBR, isobutylene-grafted SBR, maleated block SBR;

Butyl rubber (BR), chlorinated BR, sulfochlorinated BR, cyclopentadiene modified BR, epoxidized BR, sulfonated BR;

Polyisoprene, cis-1,4-polyisoprene, trans-1,4-polyisoprene, hydrogenated polyisoprene, hydroxy-terminated polyisoprene, chlorinated polyisoprene, maleinated polyisoprene, cyclized polyisoprene, epoxidized polyisoprene, amino acid-grafted polyisoprene, nitrated polyisoprene, oxidatively degraded polyisoprene;

Hevea rubber, balata, chicle, guayule, gutta percha, styrene-grafted natural rubber (NR), vinyl chloride-grafted NR, brominated NR, chlorinated NR, the cycloaddition product with diphenylnitriloimine, epoxidized NR, methyl acrylate-grafed NR, nitrated NR, oxidatively degraded NR, sulfonated NR, carbon black filled NR;

Neoprene rubber, carboxyl-terminated neoprene, chorinated neoprene, hydroxy-terminated neoprene, mercapto-terminated neoprene, nitrated neoprene, nitrile rubber, carboxylated nitrile rubber, acrylic-grafted nitrile rubber, vinyl group-terminated nitrile rubber, hydroxy-terminated nitrile rubber, amine-terminated nitrile rubber.

Those classes of polymers which possess a capture index outside the desirable range but are useful when combined with a capture enhancing modifier include:

Polysulfide rubber, thiol-terminated polysulfide rubber, silicone rubber (SR), poly(dimethylsiloxane), fluoroalkyl SR, hydroxy-terminated SR, alkoxysilane terminated SR, Poly(methyl penylsiloxane), poly(methyl vinyl siloxane);

Acrylic rubbers such as poly(co-butyl acrylate-butadiene), poly(co-methyl methacrylate-butadiene) and poly(co-dodecyl acrylate-acrylonitrile), EPDM rubbers;

Epichlorohydrin and ethylene oxide rubbers, ethylene vinyl acetate rubbers, ethylene-vinyl chloride rubbers, fluorocarbon rubbers, fluoroalkoxy phosphazene, hexafluoropropene, tetrafluoroethylene-vinylidene fluoride rubbers, hexafluoropropene-vinylidene fluoride rubbers, isoprene-styrene rubbers;

Urethane rubbers, polyether urethanes, polyethylene oxide polyurea urethanes, polyacrylate urethane rubbers, polyester urethane rubbers, vinyl urethane rubbers, castor oil-based polyester urethanes, hydroxy-terminated butadiene rubber-urethanes, polysulfide urethanes;

Poly(vinyl acetates), poly(vinyl formal), poly(vinyl butyral);

Polyvinyl chloride, poly(vinyl chloride-vinyl acetate)copolymers, poly(vinyl chloride-acrylate)copolymers, poly(vinylidene chloride), poly(vinylidene chloride-acrylonitrile)copolymers, and poly(vinylidene chloride-vinyl chloride)copolymers.

The families of compounds that are used to modify the capture index generally fall into the following generic categories: Alkenyl succinimides, adipic acid-diethylene glycol polyesters, esters of fatty acids, maleated rosin, hydrocarbon oils, alcohol-fumaric acid-tall oil rosin reaction products, asphaltics, extender oils, dehydrated castor oil, furfural or phenol modified naphthenic oils, bituminous substances including pitch, phenolic resins, diisooctyl adipate, hydroxybenzoate compounds, di(butylcarbital) formal and liquid isoprene rubber. The specific modifier used will depend on the membrane composition chosen.

Debonding Agents

The membrane composition frequently includes a debonding agent to insure easy removal of the coating from the substrate. Debonding agents that can be used in successful formulations include: silicon polymers, unsaturated fatty acid-monoamides such as an oleic acid monoamide; fatty bisamides, polyethylene glycol 140 monostearate, petrolatum, fluoroalkylpolyoxyethylenes, fluoroalkyl amino acids, sodium alkyl benzene sulfonates, modified polydimethylsiloxane, synthetic waxes including low molecular weight polyethylene waxes; hydrazine derivatives such as stearic hydrazides, and nonionic fluorosurfactants.

These debonding agents are used at the rate of 1—5% by weight of the polymer, depending on the particular agent used.

Vulcanizing Agents

Optionally, a vulcanizing agent can be added to provide enhanced film properties such as toughness, moisture impermedability, or durability.

Examples of vulcanizing agents include thermal carbon black, zinc oxide, magnesium oxide, and tetramethylthiuram disulfide, sulfur, 2-mercaptobenzothiazole, diphenylguanidine, and gum turpentines.

Pigments

The polymeric membrane can also include coloring pigments. Examples of pigments include white coloring pigments such as zinc oxide and titanium dioxide, carbon black, iron oxides (red and black), micaceous iron oxide, aluminum powder, phthalocyanine blue and phthalocyanine green.

Thickeners

Thickeners can be used to control application properties of the liquid polymer membrane, and many types can be mentioned. These include protein thickeners such as casein, certain cellulose derivatives such as hydroxyethylcellulose, acrylic polymers such as sodium polyacrylate and polyacrylic acid, polysaccharides, fumed silicas, and expandable clays such as montmorillonite and attapulgite.

These materials will normally be added in percentages of 0.1 to 20 percent by weight based on the total weight of the mixture, with 1 to 5 percent being the more common practice. Through the proper selection and balance of these ingredients, one can control the practical thickness of the membrane and thereby can optimize the film thickness to achieve desired protection and durability within the economic objectives.

Antifoam Agents

Frequently the design of a satisfactory membrane polymer composite will involve the utilization of surfactants. Correspondingly, the formulator will want to incorporate an antifoam agent. The antifoam agents include a wide range of commercially available materials. Examples include various dispersions such as reacted silica in mineral oil or silicone based materials.

These products may be used singly or in conjunction with one another. The concentration varies with the particular antifoam agent used with percentages ranging from 0.001 to 2.0 by weight of the polymer, with 0.01 to 0.5 being the more probable usage range.

Microbiocides-Mildewcides

When polymer membrane composites are designed based on aqueous emulsion polymers, a microbiocide will be in order. The phenylmercury compounds are a popular choice and have been observed to work in this service. Examples of this class of compounds include phenylmercury acetate and di(phenylmercury)dodecenyl succinate.

These microbiocides are generally used in the concentration range of 0.05 to 0.2% by weight based on the weight of the polymer.

Non-Skid Particulates

Non-skid particulates may also be added to the polymer composition to provide enhanced traction within the membrane. Addition of such particulates significantly decreases the chances for accidents caused by slipping on the membrane surface.

Suitable particulates for use in the practice of this invention are well known and include aluminum oxide, silicon carbide, silica (e.g., quartz and sand), glass shot, metal shot, and any other particulate which is hard enough to retain its anti-skid effect at the contact surface. A peferred particulate which is commercially available is industrial garnet composed of a natural occurring mixture of iron rich aluminumsilicates.

Surfactants

A surfactant is normally necessary to emulsify an aqueous polymer composition. The choice may be either anionic, and/or non-ionic, and/or cationic. Emulsification is generally accomplished in accordance with conventional practices.

With respect to the anionic surface active agents, several examples can be stated. These include: sodium oleate, potassium oleate and other metal salts of fatty acids; alkylbenzene sulfonates such as sodium dodecylbenzene sulfonate; sulfuric acid esters of higher alcohols such as sodium lauryl sulfate and ammonium lauryl sulfate; sodium alkyl sulfates and sulfonates including, for example, sodium dodecyl sulfonate.

As a nonionic surfactant, one can include: polyoxyethylene alkylaryl ethers with a HLB value of 10.9 to 19.5, as in the case of polyoxyethylene nonylphenyl ether and polyoxyethylene octylphenyl ether; polyoxyethylene alkyl ethers having an HLB value in the range of 10.8–16.5 such as polyoxyethylene lauryl ether; polyoxyethylene alkyl esters with an HLB value between 9.0 to 16.5 as in the case of polyoxyethylene stearate; polyoxyethylene benzylated phenyl ethers with an HLB of 9.2 to 18; alkylaryl phenol ethylene oxide condesates in the HLB range of 7–14; and sorbitol derivatives. Other nonionic surface active agents which may be used are condensation products of an alkyl phenol and ethylene oxide containing 8 to 9 carbon atoms in the alkyl group and from 3 to 40 oxyethylene groups; condensation products of a fatty alcohol and ethylene oxide having from 10 to 22 carbon atoms in the fatty alcohol chain and from 3 to 40 oxyethylene groups. This would include: polyoxyethylene alkyl ethers having an HLB value in the range of 6 to 18.5, such as polyoxyethylene lauryl ether; and polyoxyethylene alkyl esters with an HLB value between 6 and 18.5, as in the case of polyoxyethylene stearate.

As a cationic surfactant, alkyl triethylammonium bromides having a carbon chain length in the range of $C_8$–$C_{12}$ can be used.

The aforementioned surfactants may be used individually or in combinations of two or more to achieve the desired results. It should be pointed out that utilization of excessive amounts of the surface active agents can adversely affect the inherent properties of the resulting coating. A range of 0.1% to 20.0% by weight of the polymer is possible, with a range of 0.5 to 2.0% being the normally accepted range.

The following working examples are presented to illustrate the claimed invention, and are not intended to be limitations of any sort.

EXAMPLE 1

A liquid-applied environmental isolation cell was constructed on a job site which comprised a multistory office building complex. The project had heretofore used only polyethylene sheet goods for establishing the environmental barrier. The sequence that resulted in the formation of the liquid-applied isolation cell is as follows:

| Liquid Polymer Composition | Parts by Weight |
|---|---|
| Ucar vehicle 4414 - a proprietary product of Union Carbide Chemical Co. comprising acrylic and acrylonitrile monomers at 45% solids by weight | 100 |
| Antifoam (silicone type) | 0.5 |
| Antimildew (phenyl mercury acetate) | 0.4 |
| Hydroxyethylcellulose | 0.4 |
| Pthalocyannine blue pigment dispersion | 0.5 |
| Polyoxyethylene octylphenyl ether surfactant | 2.5 |
| Plasticizer-polyethylene wax | 0.1 |
| Capture index modifier (mineral oil) | 3.0 |

Procedure for Manufacture Of Liquid Polymer

Starting with 50 parts acrylic resin (45% solids), and using slow agitation speed of a high speed disc type impeller mixer, the following was blended; 0.4 parts mildewcide, 0.4 parts hydroxyethylcellulose, and 0.5 parts of organic blue pigment dispersion. The speed was then increased to achieve high shear and the mixture was dispersed for 30 minutes.

Following dispersion, 2.5 parts of polyoxyethylene octylphenyl ether (an anionic surfactant), and another 50 parts of the acrylic emulsion were added. This was mixed with 0.1 parts of polyethylene wax and 3 parts of mineral oil. The slurry was then dispersed until smooth, allowed to cool, and then packaged into containers suitable for transport to the jobsite.

Preliminary Qualification Testing

In order to verify that the liquid polymer composite would possess the required characteristics essential to the specified surface capture and isolation properties, the mixture was subjected to various laboratory tests with results shown in Table 1.

Material Application

The composition was shipped to a job site where asbestos removal was underway and where EPA regulation severely limited the permissible air borne asbestos in the air surrounding the isolated removal cells.

The mixture was applied to glass enclosures and shower stalls where asbestos exposure was severe. The film was compared with polyethylene sheeting for water resistance and film toughness and was judged acceptable. Removal properties from the glass enclosure were also judged satisfactory.

The polymer composition was spray applied to a room where asbestos ceiling materials were being removed. The membrane remained tightly adherent during the entire asbestos removal process. There was no difficulty with the film properties. A section of the exposed polymer membrane was examined under a 100 power microscope and a large number of asbestos fibers were observed to be imbedded in the polymeric surface and could not readily be removed.

The in situ formed membrane was subsequently removed by peeling the coating away from the protected surface starting from the higher elevations and working uniformly toward the floor.

Once removal was completed, the wall and floor surfaces were examined and found to be satisfactorily free of hazardous asbestos fiber with no subsequent cleaning necessary. Such cleaning is normally required with polyethylene sheet goods.

EXAMPLE 2

Example 2 was performed on a laboratory scale isolation cell:

| Liquid Polymer Composition | Parts by Weight |
|---|---|
| Neoprene emulsion (50% volume solids) | 100 |
| Igepal-CO-970 a nonionic surface-active agent comprising a nonyl phenol condensate with ethylene oxide containing 97% by weight of oxyethylene units based on the weight of the nonyl phenol | 5.0 |
| Mineral oil | 3.0 |
| Sodium alkylbenzenesulfonate | 1.0 |
| Antimony oxide | 40.0 |
| Hydroxyethylcellulose | 0.6 |
| Antifoam | 0.5 |
| Zinc dimethyldithiocarbamate | 1.0 |
| Titanium dioxide | 2.0 |
| Water | 50 |

Procedure For Manufacture Of Liquid Polymer

An initial mixture of 50 parts water, 5 parts Igepal 1.0 part sodium alkylbenzenesulfonate and 0.5 parts of antifoam was thickened with 0.6 parts of hydroxyethylcellulose. To this paste, were added 100 parts of neoprene emulsion (50% solids) and the 40 parts of antimony oxide, and dispersed at high shear using an impeller type disperser.

Three parts of mineral oil were dispersed into the slurry. The mixture was then tinted using 2 parts of titanium oxide (predispersed via an aqueous slurry).

Finally, the vulcanizing agent, zinc dimethyldithiocarbamate (1 part) was added to the slurry and dispersion continued for an additional 10 minutes. The polymer composition was cast onto glass plates using a 40 wet mil. drawdown bar and allowed to cure overnight. The resultant film was tough and ductile and could be easily removed from the glass plate.

Preliminary Qualification Testing

This mixture was evaluated for suitability as a spray-applied isolation cell membrane with results shown in Table 1.

The film was compared to polyethylene sheet material and was observed to be comparable in toughness and durability.

A flame spread test was conducted using a laboratory typ Bunson Burner. Both the film in Example 2 and the polyethylene were observed to burn as long as the burner provided heat, however, the example polymer was observed to stop buring once the burner was removed, whereas the polyethylene film did not.

Material Application

A simulated environmental isolation cell was constructed using this polymeric composition. The simulated cell was formed by spraying the entire interior of a walk-in paint spray booth. After covering the pressure regulators, air supply fittings and electrical switches, the overhead, walls and floors were coated with this polymeric material. The spray equipment consisted of an electric powered airless paint spray device which is routinely used for this service. The polymeric membrane was applied at a nominal wet film thickness of 21 mils. The membrane was allowed to cure overnight and the following morning was inspected for film properties and integrity. The surface was tacky and readily removed dusty contaminants from the shoe soles of inspection personnel. The membrane was subsequently "contaminated" using a simulated contaminant consisting of carbon black powder, spread uniformly over the isolation cell. The membrane type isolation cell was removed by peeling with the removal activity beginning at the higher elevations and working down. Virtually no contamination of the permanent surfaces occurred due to the surface capture properties of the isolation cell.

EXAMPLE 3

A shore based naval installation presented a potential asbestos removal hazard inasmuch as a multitude of piping runs have been insulated with asbestos bearing materials. The complex geometry of the installation complicated the formation and reliability of any polyethylene sheet enclosure. The liquid-applied conformal membrane type isolation cell was evaluated as a preferred alternative for this project. The procedure for developing this cell as as follows:

| Liquid Polymer Composition | Parts by Weight |
|---|---|
| Butadiene-styrene block copolymer emulsion (60%) | 100 |
| Tween 2, a water soluble polyoxyethylene sorbitan monolaurate | 2 |
| Span 80, an oil-soluble sorbitan mono oleate | 2 |
| Phenolic resin | 20 |
| Powdered silica (20 mesh) | 80 |
| Zinc stearate | 1 |
| Phenyl beta-napthylamine | 1 |
| Zinc dimethyldithiocarbamate | 1 |
| Water | 50 |
| Mineral | 3 |

Procedure For Manufacturing Liquid Polymer

Starting with 50 parts of styrene-butadiene rubber block copolymer vehicle, (butadiene-styrene weight ratio of 100:20), 20 parts of phenolic resin, and 80 parts of powdered silica (size 20) non-skid particulates were added with 1 part zinc stearate as a suspending agent. This mixture was subjected to a high shear disc impeller for 10 minutes. Then, following dispersion, 1 part of zinc dimethyldithiocarbamate, 1 part of phenyl beta-napthylamine, and 3 parts of mineral oil were added. Dispersion continued for another 10 minutes. The mixture was then "let down" with the remaining styrene-butadiene latex and water.

Preliminary Qualification Testing

The liquid polymer membrane was applied to laboratory surfaces and the critical performance parameters were recorded. Results are shown in Table 1.

Material Application

An atomizing air and pressure pot paint spray setup (5 gal.) was used to apply the polymeric composition. A Binks Model 18 paint spray gun equipped with a #67 setup was used for applying the material. Fluid pressure was 80 psi and atomizing air was 85 psi. The material was applied at a nominal 60 mils wet film thickness. A continuous air ventilation system was operated through the application and cure cycles.

Cure Time/Film Properties

The membrane was allowed to cure for 18 hours. The resultant membrane was tough and durable and remained in place without any assist of tape or adhesive materials throughout the removal operation.

Removal

After the asbestos was removed, the isolation cell was easily collapsed and consolidated into a disposal package for removal from the job site.

EXAMPLE 4

The polymeric membrane was comprised of the following ingredients:

| Liquid Polymer Composition | Parts by Weight |
| --- | --- |
| Polybutadiene emulsion (45% solids) | 100 |
| Dioctyl sodium sulfosuccinate (surfactant) | 5.0 |
| Mineral oil | 3.0 |
| Antimony oxide | 3.0 |
| Titanium dioxide | 3.0 |
| Hydroxyethylcellulose | 0.6 |
| Zinc dimethyldithiocarbamate | 1.0 |
| Antifoam - (silicone based) | 0.5 |
| Sodium alkylbenzene sulfonate (surfactant) | 0.5 |
| Water | 50.0 |

One hundred parts of polybutadiene emulsion were added to a pre-dispersed aqueous solution of 50 parts water, 5 parts dioctyl sodium sulfosuccinate and 0.5 parts of an anti-foam agent. This slurry was then thickened by adding 0.6 parts of hydroxyethylcellulose, and dispersed for 20 minutes under a high shear disc impeller mixer.

Three parts of mineral oil were added, followed by 3 parts of antimony oxide, three parts of titanium oxide, 0.5 parts of sodium alkylbenzene sulfonate and 1 part zinc dimethyldithiocarbamate (a vulcanizing agent). The slurry was ground at high shear for an additional 10 minutes.

This mixture was evaluated for suitability as a spray applied isolation cell membrane with results shown in Table 1.

EXAMPLE 5

An asbestos removal contractor was located who had a ceiling removal project in a large multistory postal building. The project was using architect specified polyethylene sheet goods. The resultant enclosures were held in place using duct tape and the tape was used to seal the open seams.

To achieve the desired degree of isolation, three separate plys of polyethylene sheeting were required to keep the migration of asbestos fiber residues to an acceptable level.

The project experienced economic penalties due to tape damage wherever contact was made with wall surfaces. Contractor personnel were anxious about the fire hazard, especially in corridors where the multiply polyethylene was used in large quantity.

| Liquid Polymer Composition | Parts by Weight |
| --- | --- |
| Polyisoprene-based latex (60% solids) | 100 |
| Sodium salt of the sulphuric ester of an isooctylphenoxy polyethoxy ether containing 10 moles of ethylene oxide (surfactant) | 3.0 |
| Mineral oil | 3 |
| Carbon black | 6.0 |
| Hydroxyethylcellulose | 0.6 |
| Antifoam (Silicone Derivative) | 0.5 |
| Sodium alkyl benzene sulfonate | 1.0 |
| Water | 50 |

Manufacture of Isolation Membrane Polymer Composition

A slurry paste was formed consisting of 50 parts of water and 3 parts of sodium salt of the sulphuric ester of an isooctylphenoxy polyethoxy ether containing 10 moles of ethylene oxide, an anionic surfactant. This slurry was thickened using hydroxyethylcellulose. To the mixture, 100 parts of polyisoprene rubber latex, whose solids content was 60%, was added and dispersed with an antifoaming agent.

Mineral oil in the amount of 3.0 parts was added as a plasticizer and dispersed. One part of sodium alkyl benzene sulfonate was then added to the slurry. Carbon black was added and dispersed through the mixture.

This material, once formulated, was sprayed out at 10–12 mils onto stainless steel plates and subjected to laboratory testing. The results are shown in Table 1.

Application of Polymeric Membrane Composition

The polymeric solution was shipped to the job site actively involved in removal of a ceiling heavily filled with fiberous asbestos reinforcing. The solution was spray-applied using a high pressure airless spray pump with an in bound air pressure of 60 psi and a 30:1 pressure ratio which resulted in nearly 1800 psi fluid pressure just ahead of a 0.016 inch diameter reversible spray tip. The polymeric membrane was applied at a uniform continuous wet film thickness ranging from approximately 6 mils to 40 mils. The membrane was allowed to cure for 24 hours before personnel were sent into the isolation cell to inspect the surface. Upon inspection, the isolation cell was observed to be uniform, continuous, and well adhered to the substrate. The cell surface was sufficiently sticky to remove loose dust from the shoe soles of workers.

The routine asbestos removal activities were conducted within the membrane with the following observation:

(1) There was no incident of the isolation cell becoming detached from the surface being protected;

(2) The air quality inside the cell was noticeably better during removal activities;

(3) During isolation cell removal, there was no detection of air borne asbestos fiber escaping the work area; and (4) The isolation cell membrane yielded a waste volume of approximately one fourth that normally associated with the volume of polyethylene sheet goods.

EXAMPLE 6

A private school faced a serious removal problem in several classrooms. One entire area was glass-sided, while other areas were brick or latex painted walls with geometric problems created by boards, coat hangers and storage areas.

The nature of the polyethylene and taping process creates mechanical damage to the substrates when cell removal takes place. Also, the process becomes difficult as varying temperatures (created by sunlight exposure through windows) affect the adhesive ability of the tape.

The liquid applied conformal membrane cell was an alternative to the polyethylene because of the product's ability to withstand temperature variances and maintain a consistent film. The product also showed extremely easy removal abilities while causing no severe damage problems normally associated with tape pull-off from painted surfaces.

| Liquid Polymer Composition | Parts by Weight |
| --- | --- |
| Polyisoprene latex (60% solids) | 100 |
| Ammonium laurel sulfate | 5 |
| Polyethylene wax | 3 |
| Zinc oxide | 6 |
| Hydroxyethylcellulose | 0.6 |
| Antifoam (silicone derivative) | 0.2 |
| Polyoxyethylene phenol ethylene oxide | 1.0 |
| Water | 50 |

Procedure For Maintaining Liquid Polymer

The starting slurry paste consisted of 50 parts of water, 5 parts of ammonium laurel sulfate (an anionic surfactant) and 0.6 parts of hydroxyethylcellulose, used as a thickener.

To this mixture, a polyisoprene-based emulsion consisting of a 60% solids was added. The silicone antifoaming agent was introduced, and the mixture dispersed.

Following dispersion, 3 parts of polyethylene wax was added and dispersed. Addition of 1 part of polyoxyethylene phenol ethylene oxide, 6 parts of zinc oxide and dispersion of these components completed the formulation.

The resultant liquid membrane forming material was spray-applied to a series of test surfaces similar to the techniques described in Example 1.

Performance was comparable to that of Example 1, except that the capture index was judged to be improved somewhat at a penalty to water resistance.

The manhours consumed in application of this mixture to a school classroom (walls and floor), were carefully measured and compared with the manhours which were required to construct an isolation cell via sheet goods (polyethylene). The manhours required to install the continuous membrane was shown to be 85% of that required to install polyethylene sheeting.

Preliminary Qualification Testing

The polymer formed membrane was removed by peeling the coating away from the various substrates beginning with areas closest to the ceiling, and continuing until meeting the floor. Before removing any of the floor coating, the wall surfaces were examined for potential undercreep-created water damage often associated with removal. No damage was found, and air samples indicated further collapsing of the floor area was permissable.

The floor area was also examined for mechanically created damage and no potential undercreeping/spreading of contaminants had occurred. Therefore, the final cell collapsing process was continued; notice was made of the exceptional ability to consolidate the torn down material into a small, tightly self-adhering bundle.

Material Application

An airless spray unit was used to apply the material. The unit further supported ease of application claims by demonstrating the various tip sizes that can be used to apply the material. The material was applied at various wet film thicknesses according to the surface being sprayed. The rougher substrate, the heavier the millage applied. The brick surface provided the toughest substrate and was sprayed with 20 mils. wet film thickness. The glass surface, being the smoothest substrate, required only 10 mils wet film thickness. Fluid pressure was 80 psi and atomizing air was 85 psi.

Cure Time/Film Properties

The cell was allowed to cure for 12 hours. Because of low humidity/high temperatures, the material dried quickly. The material withstood an environment of water spray, asbestos/ceiling material attack created by removal, and blow-in of new ceiling materials. The membrane showed no visible signs of penetration and superior adhesion compared to the normal taping process. The membrane was easily removed, and no physical damage occurred.

Removal

Following asbestos removal, the isolation cell was easily collapsed and consolidated into a quantity of hazardous material far less than normally found in the polyethylene and tape process.

EXAMPLE 7

A school located in the Gulf Coast area faced a serious asbestos problem within the confines of the gymnasium corridor, locker room and music room areas. The school elected to remove the asbestos and reblow ceiling areas with a different substrate. The contractor was seeking a membrane type material to protect surfaces throughout the process.

The problem of potential tears in the membrane created by work height was also a cause for concern. The contractor elected an alternative process, and because of the short period of time between the job start-up and required completion date, the membrane approach was chosen.

Surfaces included painted walls, cured cinder blocks, painted brick and painted aluminum.

| Liquid Polymer Composition | Parts by Weight |
| --- | --- |
| Water | 20 |
| Vinyl butyral emulsion (60%) | 80 |
| Antifoam (silicone based) | 0.5 |
| Antimildew agent (bactericide) | 0.8 |
| Ammonia | to adjust pH |
| Aluminum tri-hydrate | 10 |
| Antimony oxide | 3 |
| Titanium dioxide | 3 |
| Hydroxyethylcellulose | 0.6 |
| Surfactant (sodium carboxylated polyelectrolyte) | 0.3 |

Twenty parts of deionized water and 0.6 parts of hydroxyethycellulose were mixed together and dissolved completely. To this mixture sodium carboxylated polyelectrolyte (0.3 parts), along with 0.2 parts of bactericide were added. Aluminum tri-hydrate (10 parts) was then added with antimony oxide (3 parts) and titanium oxide (3 parts). The slurry was dispersed for 20 minutes using a high spear disc type impeller, operating at 3000 rpm with a 4 inch high shear impeller blade. The pH was then adjusted to 8.0 with ammomia.

Antifoam (0.5 parts), and 80 parts of polyvinyl butyral emulsion (60% solids) were added. The remaining antimildewing agent was added to complete the membrane polymer composition.

This mixture was evaluated and found satisfactory as an isolation cell membrane (see Table 1).

Material Application

This mixture was spray-applied into a school auditorium where ventilation system was purposefully deactivated. The spray applied solution was judged to provide acceptable results.

The polymeric solution was subsequently made available to the contractor who was engaged in asbestos removal, and where one classroom was set aside to receive the experimental liquid applied isolation cell process.

The cell was developed as follows: All loose cracks such as doorway openings, air ventilation grills, electrical switches and such were covered using tape or sheet goods coverings.

The solution of Example 7 was applied to all walls, floors, door panels, windows, and such using a high pressure airless spray pump. Inbound air was 80 psi and the pump ratio was 45.1. This resulted in a delivery pressure of 3600 psi. The material was transferred through a ⅜" diameter sprayhose 150 feet long permitting the spray pump to be located in a remote area outside the hazardous materials isolation cell. The spray tip was an adjustable unit operating at approximately 0.036 inch diameter opening.

This polymeric isolation cell membrane was liquid applied at a uniform wet film thickness of 10 mils to 35 mils with the nominal targeted at 20 mils wet.

Cure Time/Film Properties

The cell was allowed to cure overnight. The next morning the cell was inspected and observed to present a continuous barrier.

The liquid applied barrier was tightly adherent, and was easily removed upon completion of the asbestos removal process. Laboratory microscope analysis of the exposed film showed asbestos fibers imbedded in the polymeric surface.

Removal

Waste volume was judged to be one half that of the normally related to polyethylene sheet goods. The flame spread and smoke combustion was judged to be substantially less than the polyethylene.

TABLE 1

| | | | Laboratory Qualification Test Results | | | | | | | | | |
|---|---|---|---|---|---|---|---|---|---|---|---|---|
| | | | Capture Index[3] | | | | | | | Volume | Cohesive[6] | |
| Composition | Strip[1] | | Dry | | Wet | | Water Resistance[4] | | | Reduction[5] | Compaction Data | |
| Number | Index | Elongation[2] | Asbestos | Lead | Asbestos | Lead | $WR_1$ | $WR_{24}$ | $WR_{48}$ | Factor | $CC_1$ | $CC_{24}$ |
| Polyethylene Film (4 mils) | N/A | 46.17% | N/A | N/A | N/A | N/A | N/A | N/A | N/A | 1.969 | 350.0% | 400.0% |
| EX 1 | 21.4 | 83.4% | 4.7 | 14.4 | 3.1 | 8.6 | 1 | 3 | 3.5 | 1.813 | 9.2% | 10.1% |
| | | | | | | | 2 | 3 | 5 | | | |
| EX 2 | 130.4 | 216.7% | 5.4 | 19.1 | 4.5 | 15.3 | 1 | 1 | 1.5 | 1.947 | 4.9% | 8.6% |
| | | | | | | | 1 | 1.5 | 2.5 | | | |
| EX 3 | 179.1 | 302.1% | 4.5 | 13.1 | 2.9 | 7.3 | 1 | 2 | 2.5 | 1.713 | 1.9% | 3.1% |
| | | | | | | | 1 | 3 | 4.5 | | | |
| EX 4 | 94.6 | 187.8% | 2.6 | 9.1 | 2.4 | 7.9 | 1 | 2 | 3 | 1.804 | 3.1% | 4.6% |
| | | | | | | | 1 | 2.5 | 4 | | | |
| EX 5 | 113.0 | 141.4% | 2.1 | 9.8 | 2.0 | 7.9 | 1 | 2.5 | 3.5 | 1.604 | 2.1% | 6.9% |
| | | | | | | | 1.5 | 3.0 | 4.5 | | | |
| EX 6 | 139.2 | 212.4% | 3.4 | 12.6 | 2.8 | 11.1 | 1 | 1 | 2 | 1.551 | 3.7% | 6.9% |
| | | | | | | | 1 | 2.5 | 3.5 | | | |
| EX 7 | 142.3 | 388% | 6.04 | 24.8 | 5.5 | 20.7 | 1 | 1 | 1 | 1.753 | 3.1% | 6.7% |

TABLE 1-continued

| Composition Number | Strip[1] Index | Elongation[2] | Capture Index[3] | | | | Water Resistance[4] | | | Volume Reduction[5] Factor | Cohesive[6] Compaction Data | |
|---|---|---|---|---|---|---|---|---|---|---|---|---|
| | | | Dry | | Wet | | | | | | | |
| | | | Asbestos | Lead | Asbestos | Lead | $WR_1$ | $WR_{24}$ | $WR_{48}$ | | $CC_1$ | $CC_{24}$ |
| | | | | | | | 1 | 1 | 1.5 | | | |

FOOTNOTES:

[1] $S.I. = \dfrac{(Load \times Time/Area)\ tensile}{(Load \times Time/Area)\ adhesion}$ where:
load adhesion = force to strip membrane from stainless
time adhesion = time to peel a 3" wide strip
load tensile = force required to break film
time tensile = time for unit force to break film (at 100% elongation)
area = width of film × thickness of film

[2] $E = \dfrac{L_f - L_i}{L_i} \times 100\%$ where $L_f$ = final length at break
where $L_i$ = initial film length

[3] $C.I. = W_f - W_i/area\ (mg/in^2)$ where $W_f$ = final weight of panel consisting of: 3" × 6" glass slide, polymeric membrane and captured contaminant
$W_i$ = initial weight of panel plus polymeric membrane
NOTE: Capture Index (wet) — relates ability of polymeric membrane to hold contaminant after surface wash with water and subsequent drying.

[4] $WR_1$ = membrane's bond integrity after one hour immersion in water
$WR_{24}$ = 24 hr. immersion
$WR_{48}$ = 48 hr. immersion
Numeric Key:
1 = no change in membrane
2 = slight undercreep in water beneath membrane
3 = moderate undercreep and uplift of membrane
4 = heavy undercreep and uplift
5 = complete loss of bond
NOTE: upper left rating is for undamaged membrane on stainless steel; lower right value refers to damaged membrane on stainless.

[5] Diameter in inches of compacted wasteform resulting from a 12" × 12" area compacted into a tight ball.

[6] Percent increase in diameter of above "ball" after standing for 1 hour and 24 hours reported as $CC_1$ and $CC_{24}$ respectively. Reported as percent increase, i.e., $CC = \dfrac{D_f - D_i}{D_i} \times 100\%$ where $D_f$ = final diameter
$D_i$ = initial diameter

What is claimed is:

1. A process for isolating asbestos within an area, comprising the steps of
    applying a liquid polymer composition in aqueous dispersion to the surfaces to be protected,
    allowing the liquid polymer composition to coalesce into a water insensitive and insoluble seamless, bladder-like membrane which adheres to the surface to provide a high integrity receptacle capable of receiving and sustaining an influx of bulk asbestos, and which can be removed intact by physically peeling from the surface to which it has been applied,
    peeling the membrane from the surface, and
    compacting the peeled membrane to form a package of sufficient integrity to retain any entrapped asbestos throughout a disposal process.

2. The process of claim 1, wherein the percent elongation of the membrane is at least 83.4, and the membrane, when bonded onto stainless steel, can maintain the integrity of its bond unchanged after a one hour immersion in water.

3. The process of claim 1, wherein
    the liquid polymer composition forms an asbestos capturing membrane capable of immobilizing asbestos particles which contact the membrane's surface.

4. The process of claim 3, wherein
    the membrane is capable of immobilizing at least 2 mg of asbestos particulate per square inch.

5. The process of claim 3, wherein
    the polymer membrane possesses ethylenic double bond functionality useful in the immobilization of asbestos.

6. The process of claim 3, wherein the liquid polymer composition includes a capture index modifier to enhance the capture index of the membrane.

7. The process of claim 6, wherein the capture index modifier comprises an alkenyl succinimide, adipic acid-diethylene glycol polyester, ester of a fatty acid, maleated rosin, hydrocarbon oil, alcohol-fumaric acid-tall oil rosin reaction product, asphaltic, extender oil, dehydrated castor oil, furfural or phenol modified naphthenic oil, bituminous substance, phenolic resin, diisooctyl adipate, hydroxybenzoate compound, di(butylcarbital) formal or liquid isoprene rubber.

8. The process of claim 6, wherein the membrane has a capture index of at least 2 mg asbestos/in$^2$.

9. The process of claim 3, wherein the liquid polymer composition comprises cis-1,4-polyisoprene, hevea rubber, trans-1,4-polyisoprene, gutta percha rubber, balata rubber, trans-1,4-polybutadiene, cis-1,4-polybutadiene, neoprene, butadiene-styrene copolymer or 1,2-polybutadiene rubber.

10. The process of claim 9, wherein the polymer is cis- or trans-1,4-polyisoprene.

11. The process of claim 9, wherein the polymer is hevea rubber of balata rubber.

12. The process of claim 9, wherein the polymer is cis- or trans-1,4 polybutadiene.

13. The process of claim 9, wherein the polymer is gutta percha rubber.

14. The process of claim 9, wherein the polymer is neoprene or a butadiene-styrene copolymer.

15. The process of claim 9, wherein the membrane is capable of immobilizing at least 2 mg of asbestos particulate per square inch.

16. The process of claim 9, wherein the composition further comprises a debonding agent.

17. The process of claim 16, wherein the liquid polymer composition comprises
from about 38 to about 93 weight percent of the polymer in suspension, and
from about 0.38 to about 4.6 weight percent of a debonding agent.

18. The process of claim 17, wherein the debonding agent comprises silicon polymer, unsaturated fatty acid-monoamide, fatty bisamide, polyethylene glycol 140 monostearate, petrolatum, fluoroalkylpolyoxyethylenes, fluoroalkyl amino acids, sodium alkyl benzene sulfonates, modified polydimethylsiloxane, synthetic waxes, hydrazine derivatives, or nonionic fluorosurfactants.

19. The process of claim 18, wherein the debonding agent is a synthetic wax.

20. The process of claim 16, wherein the membrane is capable of immobilizing at least 2 mg of asbestos particulate per square inch.

21. The process of claim 16, wherein the composition comprises a fire retardant.

22. The process of claim 21, wherein the composition comprises from about 1.8 to about 15.8 weight percent of fire retardant.

23. The process of claim 22, wherein the fire retardant comprises antimony oxide or alumina trihydrate.

24. The process of claim 21, wherein the membrane is capable of immobilizing at least 2 mg of asbestos particulate per square inch.

25. The process of claim 3, wherein the liquid polymer composition further comprises at least one additive, wherein the additive composes coloring pigment, thickener, antifoam agent, antimicrobial, mildewcide, non-skid particulate, emulsifying surfactant, organic debonding agent, vulcanizing agent, capture index modifier, or flame retardant.

26. The process of claim 25, wherein the composition further comprises a debonding agent.

27. The process of claim 26, wherein the liquid polymer composition comprises
from about 38 to about 93 weight percent of the polymer in suspension, and
from about 0.6 to about 4.6 weight percent of a debonding agent.

28. The process of claim 27, wherein the debonding agent comprises a silicon polymer, unsaturated fatty acid-monoamide, fatty bisamide, polyethylene glycol 140 monostearate, petrolatum, fluoroalkylpolyoxyethylene, fluoroalkyl amino acid, sodium alkyl benzene sulfonate, modified polydimethylsiloxane, synthetic wax, hydrazine derivative, or nonionic fluorosurfactant.

29. The process of claim 28, wherein the debonding agent is a synthetic wax.

30. The process of claim 26, wherein the membrane is capable of immobilizing at least 2 mg of asbestos particulate per square inch.

31. The process of claim 26, wherein the composition further comprises a fire retardant.

32. The process of claim 31, wherein the composition comprises from about 1.8 to about 15.8 weight percent of fire retardant.

33. The process of claim 32, wherein the fire retardant comprises antimony oxide or alumina trihydrate.

34. The process of claim 31, wherein the membrane is capable of immobilizing at least 2 mg of asbestos particulate per square inch.

35. The process of claim 26, wherein the composition further comprises a coloring pigment.

36. The process of claim 35, wherein the coloring pigment comprises zinc oxide and titanium dioxide, carbon black, iron oxides (red and black), micaceous iron oxide, aluminum powder, phthalocyanine blue or phthalocyanine green.

37. The process of claim 26, wherein the composition comprises a capture index modifier.

38. The process of claim 37, wherein the capture index modifier comprises an alkenyl succinimide, adipic acid-diethylene glycol polyester, ester of a fatty acid, maleated rosin, hydrocarbon oil, alcohol-fumaric acid-tall oil rosin reaction product, asphaltic, extender oil, dehydrated castor oil, furfural or phenol modified naphthenic oil, bituminous substance, phenolic resin, diisooctyl adipate, hydroxybenzoate compound, di(butylcarbital) formal or liquid isoprene rubber.

39. The process of claim 37, wherein the membrane is capable of immobilizing at least 2 mg of asbestos particulate per square inch.

40. The process of claim 27 wherein the liquid polymer composition comprises
from about 38 to about 93 weight percent of the polymer in suspension,
from 0 to about 4.6 weight percent of a debonding agent,
from about 0 to about 15.8 weight percent of fire retardant,
from 0 to about 20 weight percent of a thickener,
from 0 to about 1.8 weight percent of an antifoam agent,
from 0 to about 3.6 weight percent of an emulsifying surfactant,
from 0 to about 1.8 weight percent of antimicrobial, and
from 0 to about 31 weight percent of non-skid particulate.

41. The process of claim 40, wherein the composition further comprises a coloring pigment.

42. The process of claim 40 wherein the liquid polymer composition comprises
from about 49 to about 93 weight percent of the polymer in suspension,
from about 0.49 to about 4.6 weight percent of a debonding agent
from about 1.8 to about 15.8 weight percent of fire retardant,
from about 0.25 to about 3.6 weight percent of emulsifying surfactant,
from about 0.49 to about 5.4 weight percent of a vulcanizing agent, and
from about 0.1 to about 5 weight percent of a thickener.

43. The process of claim 42 wherein the composition further comprises
up to about 7.8 weight percent of a capture index modifier,
up to about 1.8 weight percent of an antifoam agent, and
up to about 0.18 weight percent of a mildewcide.

44. The process of claim 42 wherein the composition includes a pigment.

45. The process of claim 42, wherein the liquid polymer composition comprises cis-1,4-polyisoprene, hevea rubber, trans-1,4-polyisoprene, gutta percha rubber, balata rubber, trans-1,4-polybutadiene, cis-1,4-polybutadiene, neoprene, butadiene-styrene copolymer or 1,2-polybutadiene rubber.

46. The process of claim 40, wherein the liquid polymer composition comprises cis-1,4-polyisoprene, hevea rubber, trans-1,4-polyisoprene, gutta percha rubber, balata rubber, trans-1,4-polybutadiene, cis-1,4 polybutadiene, neoprene, butadiene-styrene copolymer or 1,2-polybutadiene rubber.

* * * * *